Sept. 16, 1952         J. H. STARK         2,610,993
ADJUSTABLE MAGNETIC SHUNT FOR PERMANENT MAGNET GENERATORS
Filed July 12, 1951
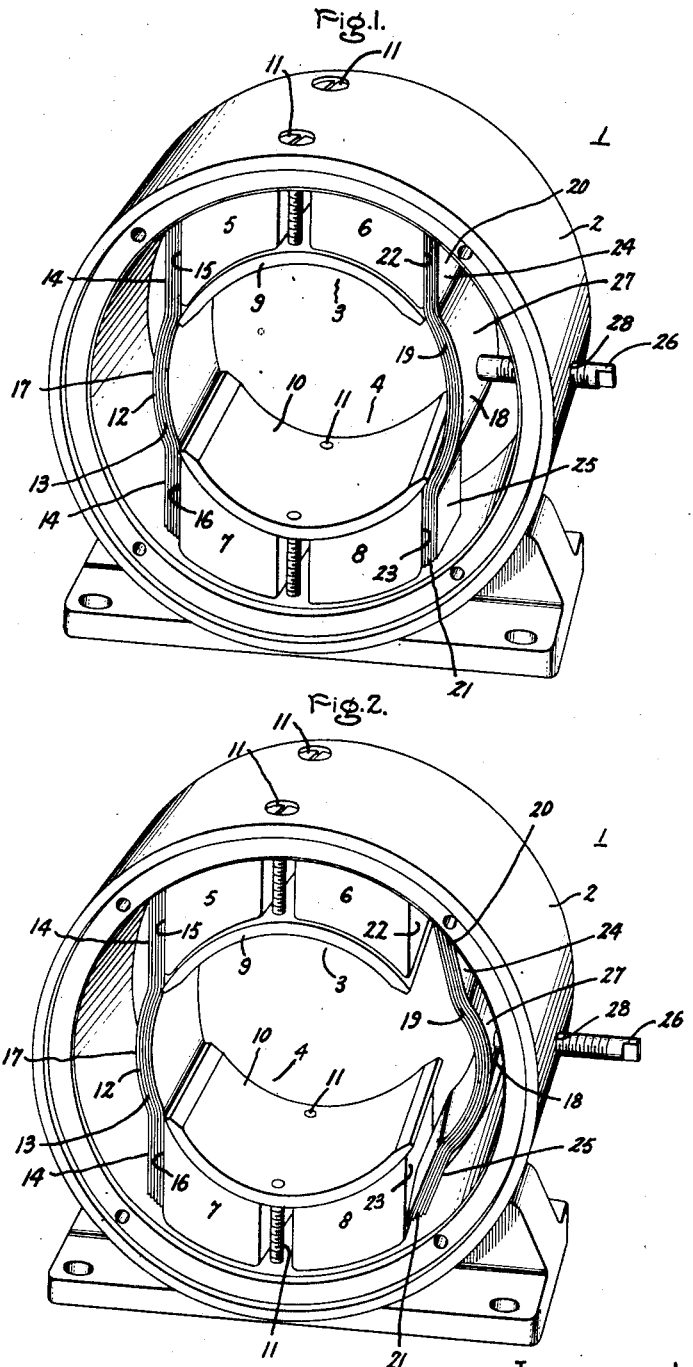
Inventor:
Julian H. Stark,
by Ernest K. Britton
His Attorney.

Patented Sept. 16, 1952

2,610,993

UNITED STATES PATENT OFFICE 2,610,993

ADJUSTABLE MAGNETIC SHUNT FOR PERMANENT MAGNET GENERATORS

Julian H. Stark, Fort Wayne, Ind., assignor to General Electric Company, a corporation of New York Application July 12, 1951, Serial No. 236,311

3 Claims. (Cl. 171—252)

This invention relates to dynamoelectric machines and, more particularly, to permanent magnet excited machines having means for preventing demagnetization of the permanent magnets and for adjusting the output voltage.

Many dynamoelectric machines, particularly in the fractional horsepower frame sizes, such as tachometer generators, utilize permanent magnet excitation. In such machines, it is particularly important to provide maximum effective flux density in pole pieces with the minimum amount of permanent material. In conventional machines of this type, having permanent magnet pole pieces, it is customary to first magnetize the stator in a suitable device without the rotor positioned therein, and then to expose the stator to an open air condition of high external reluctance, so that the stator is air stablized prior to assembly of the rotor therein. When the stator is exposed in this manner, the magnet flux density drops to a fairly low point on the demagnetization curve of the major hysteresis loop in the second quadrant. However, when the rotor is positioned in the stator with an accompanying, greatly-reduced external reluctance, the magnet flux density rises along the minor loop to a predetermined point sufficient to supply the operating flux of the machine. The rotor may thereafter be removed from and replaced in the stator repeatedly without loss of flux, providing however, that it is not subjected to a greater demagnetizing force than that of the original open air reluctance. The minor loop as a result of the air exposure is, however, so low that a relatively large amount of magnet material must be used to produce a given working flux. This condition may be greatly improved by providing the permanent magnet pole pieces of the stator with a fixed shunt flux path of a somewhat greater reluctance than the reluctance of the working air gap, to carry the magnet flux when the rotor is not positioned in the stator, and also to protect the permanent magnet pole pieces against demagnetization due to short circuits in the output or the armature and to decrease the effect of air aging. This shunt flux path is in parallel with the working flux path through the air gap of the machine, and when the rotor is positioned in the stator, bypasses only a small portion of the total flux since the shunt gap reluctance is larger than the working air gap reluctance between the rotor and the stator. However, as the rotor is not positioned in the stator, the rotor shunt air gap provides a path of comparatively low reluctance so that the flux density does not drop to as low a point on the major hysteresis loop as before, and the operating range is along a minor hysteresis loop at a considerably higher flux level than would be possible if the shunt flux path were not provided. Thus, the magnetic flux density is held at a higher level when the rotor is removed from or replaced in the stator than would otherwise be the case, and, therefore, more working flux is available from a given amount of permanent magnet material or the size of the permanent magnet pole pieces may be reduced to deliver the required amount of flux. It has also been found desirable to provide means for conveniently adjusting the output voltage of machines of this type and to accomplish this object by adjusting the amount of flux bypassed around the working air gap.

It is an object of this invention, therefore, to provide an improved dynamoelectric machine of the permanent magnet excited variety having means for shunting a portion of the flux around the working air gap to prevent demagnetization of the permanent magnets, and for adjusting the output voltage of the machine.

Further objects and advantages of this invention will become apparent and the invention will be better understood by reference to the following description and the accompanying drawings, and the features of novelty which characterize this invention will be pointed out with particularity in the claims annexed to and forming a part of the specification.

In accordance with this invention, a dynamoelectric machine stator is provided having a shell member with a pair of permanent magnet pole pieces projecting radially inward therefrom. A stationary shunt member formed of a plurality of separate laminations respectively abuts one side of each of the permanent magnet pole pieces and is held in position by leakage flux flowing therethrough. This stationary shunt member forms the shunt flux path for preventing demagnetization of the permanent magnet pole pieces. In order to provide for adjustment of the output voltage, an adjustable shunt member formed of a plurality of laminations is provided respectively abutting the other sides of the permanent magnet pole pieces and means are provided for adjusting the amount of engagement of the adjustable shunt member with the other sides of the permanent magnet pole pieces.

In the drawing, Fig. 1 is a view in perspective illustrating the improved construction of this invention showing the adjustable shunt member arranged to shunt the maximum amount of permanent magnet flux; and Fig. 2 shows the arrangement of Fig. 1 with the adjustable shunt member arranged to shunt the minimum amount of permanent magnet flux.

Referring now to the drawing, there is shown a stator member 1 for a dynamoelectric machine having a shell portion 2 formed of magnetic material and a pair of permanent magnet excited pole pieces 3 and 4 projecting radially inward therefrom. Each of the pole pieces 3 and 4 comprises a pair of permanent magnets 5 and 6, and 7 and 8, respectively, with pole shoes 9 and 10. The pole piece assemblies 3 and 4 are held in assembled relation by means of suitable screws 11 with the permanent magnets being clamped between the pole shoes and the yoke. It will be readily understood that any other suitable form of permanent magnet excited pole pieces may be utilized in this invention.

In order to provide a shunt flux path for the permanent magnet pole-piece assemblies 3 and 4, a stationary shunt member 12 is provided, formed of a plurality of separate laminations 13. The end portion 14 of the shunt member 12 respectively abuts the sides 15 and 16 of the permanent magnets 5 and 7 and the central portion 17 is bowed to accommodate the armature of the machine (not shown). As will be hereinafter described, it is desirable that the shunt member 12 be saturated with the permanent magnet flux passing therethrough and, therefore, the number of laminations 13 may be increased or decreased to secure the saturated condition.

If the permanent magnet pole piece assemblies 3 and 4 are magnetized with the armature of machine in place, the resultant voltage output will be higher than required, and it is furthermore desirable to provide means for adjusting the output voltage of the machine. Therefore, an adjustable shunt member 18 is provided, formed of a plurality of laminations 19. The adjustable shunt member 18 has its ends 20 and 21 respectively abutting the sides 22 and 23 of the permanent magnets 6 and 8, and as shown in Figs. 1 and 2, is movable from a first position as shown in Fig. 1 with its end portions 24 and 25 respectively abutting the sides of 22 and 23 of the permanent magnets 6 and 8 to a second position as shown in Fig. 2 with its end portions 24 and 25 completely out of engagement with the sides 22 and 23 of the permanent magnets 6 and 8. Adjustment of the adjustable shunt member 18 is provided by means of a screw 26 seated in the bowed portion 27 of the adjustable shunt member 18 and threadingly engaging a suitable opening 28 in the shell 2. During assembly, the magnets 5, 6, 7 and 8 are prevented from circumferential movement by the shunts 12 and 18.

Thus, by turning the adjusting screw 26 in one direction, the laminations 19 of the adjustable shunt member 18 are moved in against the sides of the permanent magnets 6 and 8 so that a larger portion of the permanent magnet flux is shunted around the armature, thus reducing the output voltage, and when the screw 26 is moved in the opposite direction, the laminations are moved away from the permanent magnets 6 and 8, thus reducing the shunted flux and increasing the output voltage. Adjustment of the adjustable shunt member 28 by means of the screw 26 will have complete control over the output voltage as long as the stationary shunt member 12 is saturated.

Without the improved shunt construction described above, the amount of permanent magnet material required to produce a rated-output voltage is much greater because of losses due to air aging, and furthermore, the possibility of loss of permanent magnet excitation of the armature or due to removal of the armature or overload or short circuit, is eliminated. Furthermore, adjustment of the output voltage is conveniently provided eliminating the necessity for short circuiting a portion of the armature. With this arrangement, the field structure can be magnetized after assembly and positioning of the armature therein without the hazard of excessive demagnetization either by short circuit or removal of the armature and the user has available a convenient method of calibration or adjustment of the output voltage.

While I have illustrated and described a particular embodiment of this invention, further modifications and improvements will occur to those skilled in the art. I desire that it be understood, therefore, that this invention is not limited to the particular form shown and I intend in the appended claims to cover all modifications which do not depart from the spirit and scope of this invention.

What I claim as new and desire to secure by Letters Patent of the United States is:

1. In a dynamoelectric machine, a stator member having a shell member, a pair of permanent magnet pole pieces projecting radially inward therefrom, a stationary shunt member formed of a plurality of separate laminations respectively abutting one side of each of said permanent magnet pole pieces and held in position by leakage flux therethrough for preventing demagnetization of said permanent magnet pole pieces, said shunt member being saturated by the leakage flux between said permanent magnet pole pieces, an adjustable shunt member formed of a plurality of laminations respectively abutting the other sides of said permanent magnet pole pieces, and means for adjusting the amount of engagement of said adjustable shunt member with said permanent magnet pole pieces for controlling the output voltage of said machine.

2. In a dynamoelectric machine, a stator member having a shell member, a pair of permanent magnet pole pieces projecting radially inward therefrom, a stationary shunt member formed of a plurality of laminations respectively abutting one side of each of said permanent magnet pole pieces and held in position by leakage flux therethrough for preventing demagnetization of said permanent magnet pole pieces, said shunt member being saturated by the leakage flux between said permanent magnet pole pieces, an adjustable shunt member formed of a plurality of laminations having its ends respectively engaging the other sides of said permanent magnet pole pieces and having its end portions adjustably removable from a first position abutting said other sides of said permanent magnet pole pieces to a second position with said end portions out of engagement with said other sides of said permanent magnet pole pieces, and means for adjusting the position of said end portions of said adjustable shunt member relative to said other sides of said permanent magnet pole pieces for regulating the leakage flux therethrough whereby the output voltage of said machine is controlled.

3. In a dynamoelectric machine, a stator member having a shell member, a pair of permanent magnet pole pieces projecting radially inward therefrom, a stationary shunt member formed of a plurality of separate laminations respectively abutting one side of each of said permanent magnet pole pieces and held in position by leakage flux therethrough for preventing demagnetization of said permanent magnet pole pieces, said shunt member being saturated by the leakage flux between said permanent magnet pole pieces, an adjustable shunt member formed of a plurality of laminations having its ends respectively engaging the other sides of said permanent magnet pole pieces and having its end portions adjustably movable from a first position abutting said other sides of said permanent magnet pole pieces to a second position with said end portions of engagement with said other sides of said permanent magnet pole pieces, and means for adjusting the position of said end portions of said adjustable shunt member relative to said other sides of said permanent magnet pole pieces for regulating the leakage flux therethrough whereby the output voltage of said machine is controlled.

JULIAN H. STARK.

REFERENCES CITED

The following references are of record in the file of this patent:

UNITED STATES PATENTS

| Number | Name | Date |
|---|---|---|
| 1,720,208 | Collins | July 9, 1929 |